United States Patent
Ciampa et al.

[15] 3,645,647
[45] Feb. 29, 1972

[54] POSITIVE DISPLACEMENT FLUID PUMPS

[72] Inventors: Fred A. Ciampa, Birmingham; Sergio J. Mazzola, Dearborn, both of Mich.

[73] Assignee: Ford Motor Company, Dearborn, Mich.

[22] Filed: Jan. 14, 1970

[21] Appl. No.: 2,702

[52] U.S. Cl. ................................ 417/79, 417/87, 417/310, 418/267
[51] Int. Cl. .................... F04b 23/04, F04c 1/00, F04b 49/00
[58] Field of Search ................ 417/87, 85, 310, 79, 263, 300; 418/262

[56] References Cited

UNITED STATES PATENTS

| 2,818,813 | 1/1958 | Pettibone et al. | 417/300 X |
| 3,403,630 | 10/1968 | Clark et al. | 417/310 X |
| 3,490,377 | 1/1970 | Tittmann | 417/300 |
| 2,858,766 | 11/1958 | Toschoff | 417/79 |
| 2,887,060 | 5/1959 | Adams et al. | 417/79 |
| 2,921,530 | 1/1960 | Aumick | 417/310 |
| 2,983,226 | 5/1961 | Livermore | 417/79 |

FOREIGN PATENTS OR APPLICATIONS

| 654,271 | 12/1962 | Canada | 417/310 |

Primary Examiner—Carlton R. Croyle
Assistant Examiner—Richard E. Gluck
Attorney—John R. Faulkner and Donald J. Harrington

[57] ABSTRACT

A positive displacement fluid pump adapted especially to be used in a power steering circuit for an automotive vehicle, said pump including a pump housing in which is formed internal high-pressure cavities in communication with the discharge side of the pump and internal porting for controlling discharge and entry of fluid for the pumping chambers of the pump, an integrated reservoir surrounding the housing and a flow control valve assembly in fluid communication with supercharged portions of the pump, the overall pump assembly being characterized by reduced axial and radial dimension.

6 Claims, 10 Drawing Figures

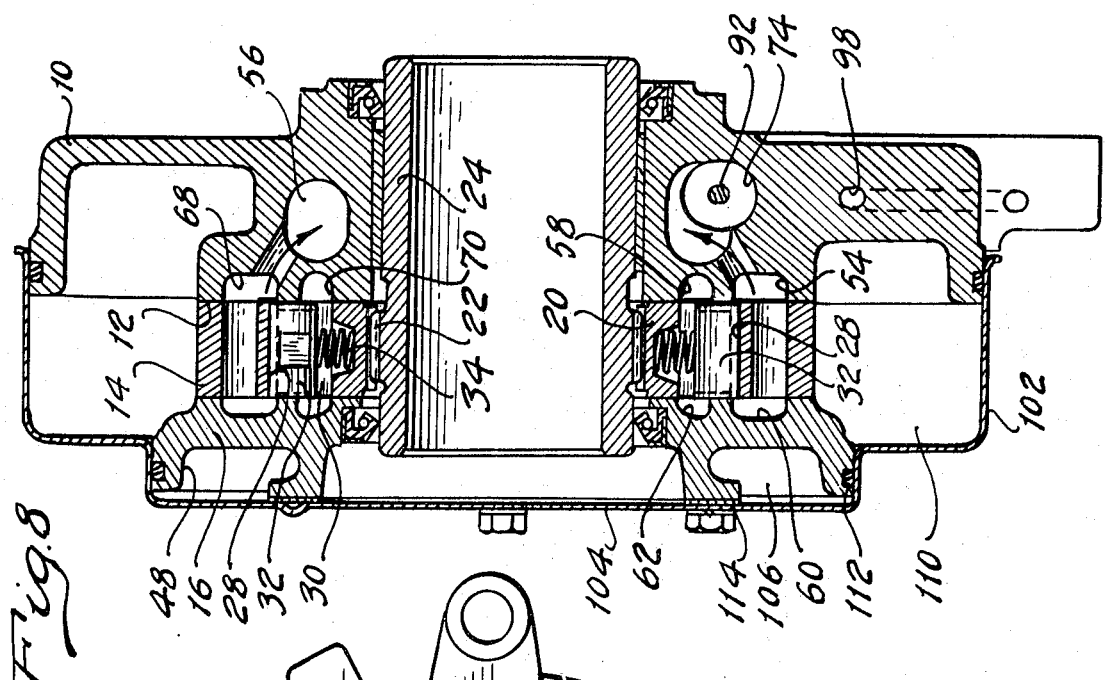
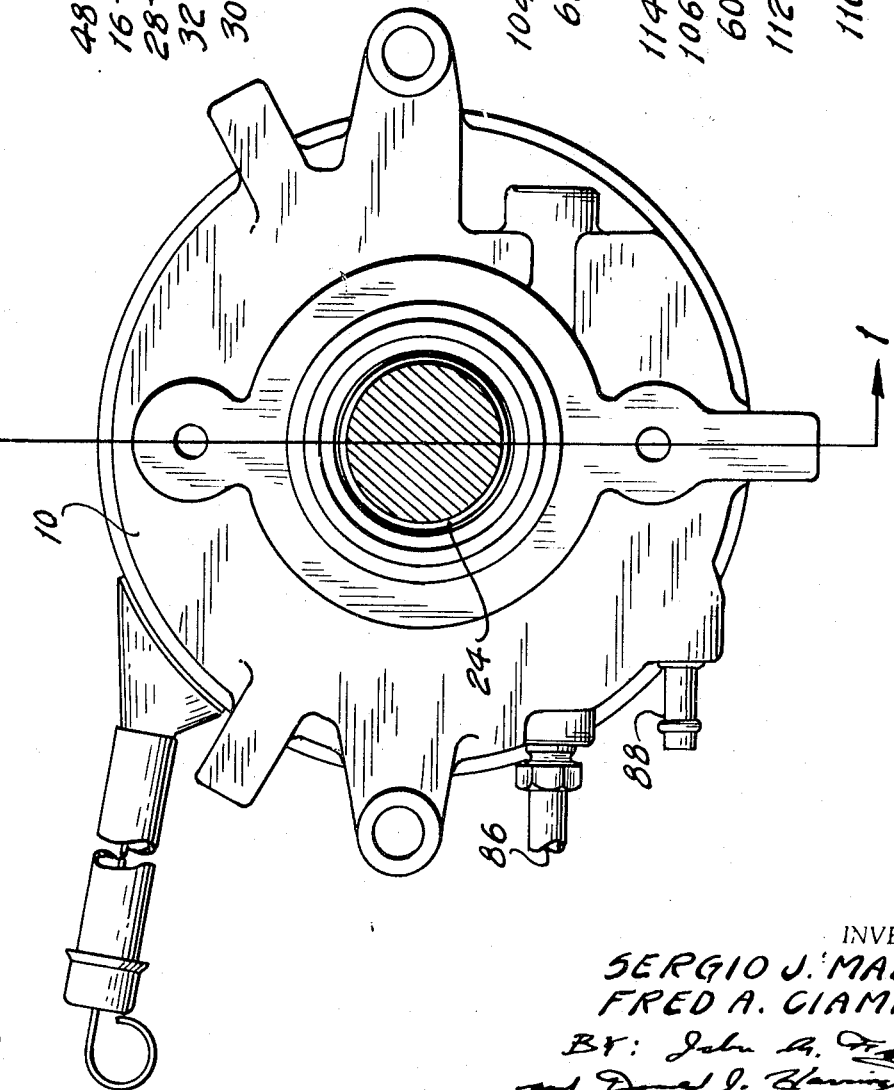

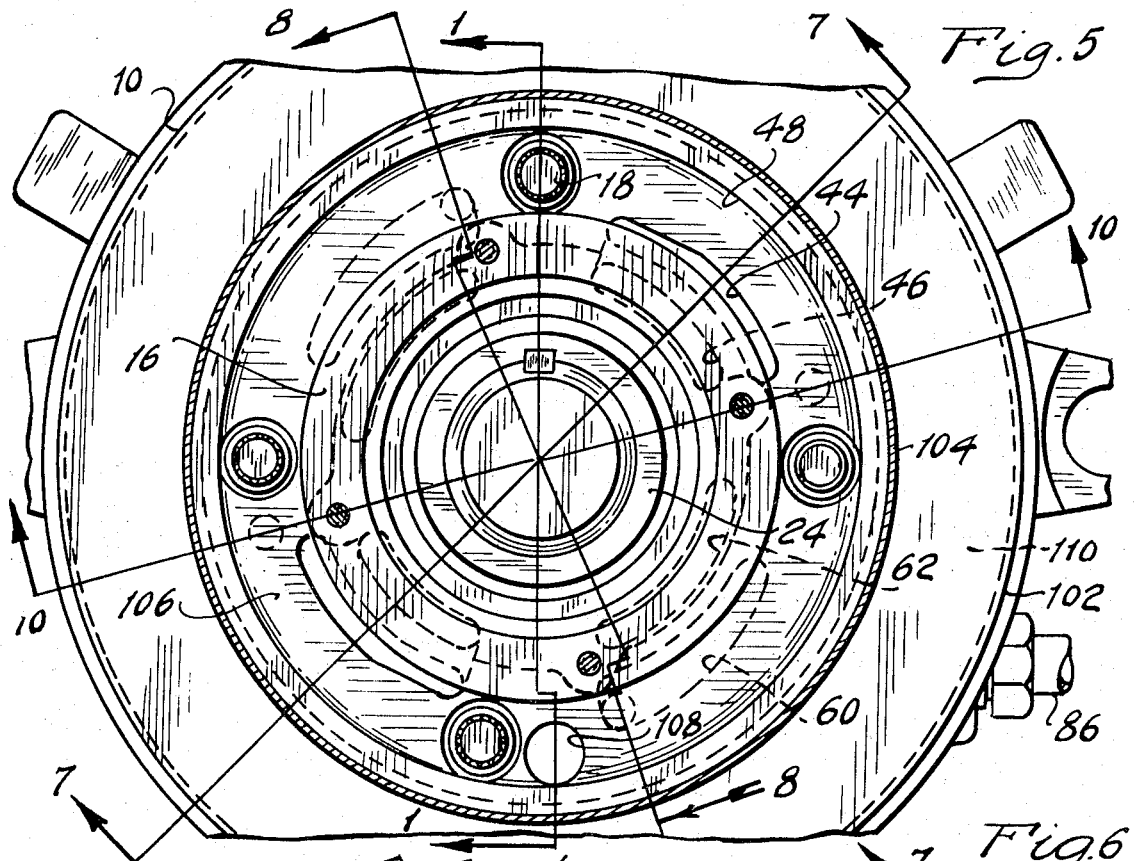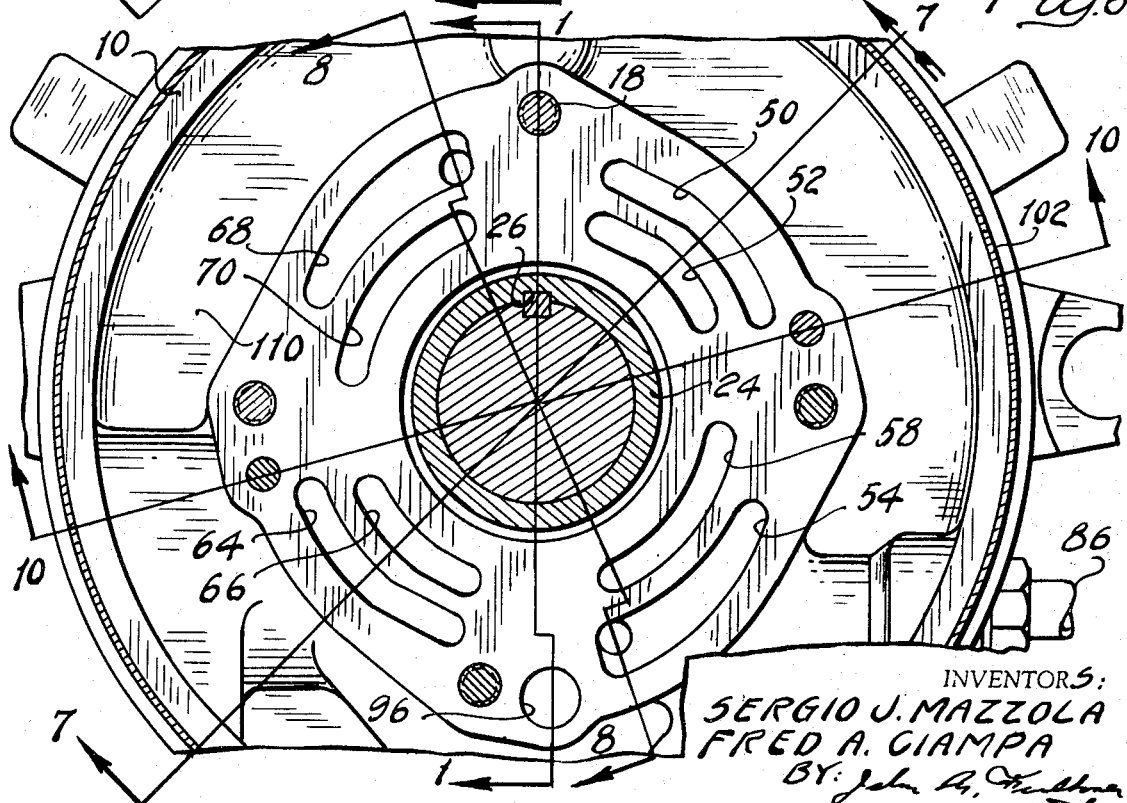

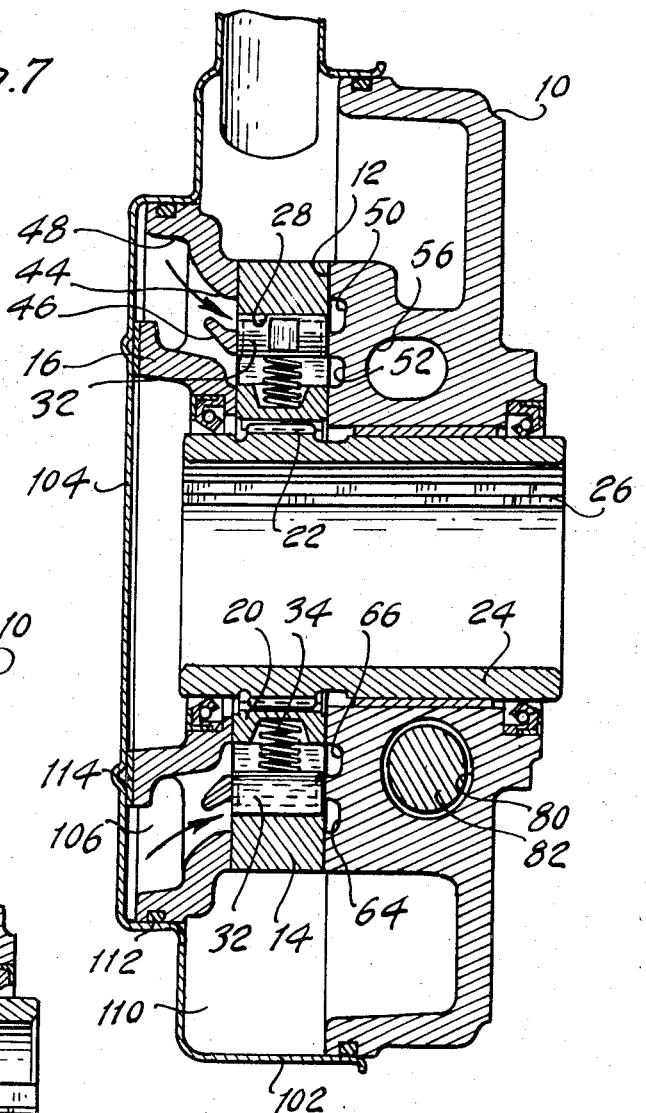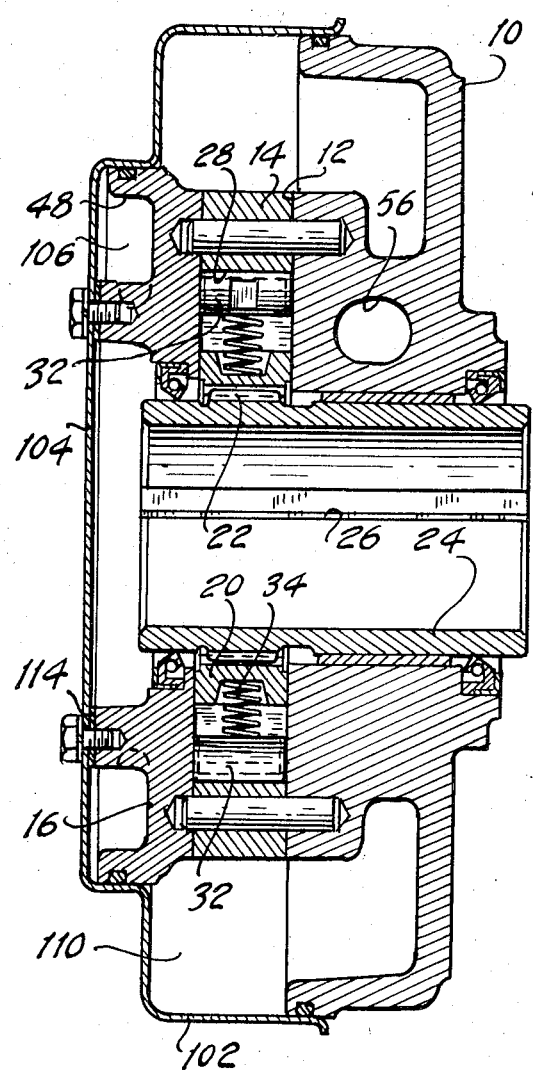

POSITIVE DISPLACEMENT FLUID PUMPS

GENERAL DESCRIPTION OF THE INVENTION

The improved pump of our invention comprises a pump housing having a pump cavity formed therein. A cam ring is positioned in the cavity, and a pump rotor is rotatably journaled in the cam ring. The rotor has pumping elements formed on its periphery in the form of slippers which slidably engage an internal cam surface formed on the cam element. The rotor cooperates with the cam element to define two diametrically opposed pumping chambers. Each pumping chamber is provided with an inlet port and an outlet port. The porting is formed in the housing itself rather than in auxiliary pressure plates as is the case with most prior art pump designs of this type.

A flow control valve is situated within the pump housing. It separates the outlet flow of the pump into two components, one being delivered to the pump delivery passage and the other being bypassed to the inlet side of the pump. Located in the bypass passage is an aspirator which causes velocity pressure to be developed thereby supercharging the intake side of the pump to permit more efficient flow entry into the intake ports. The aspirator action is achieved by accelerating the fluid in the bypass flow passage. This draws fluid from the reservoir thereby maintaining continuous circulation, the fluid from the reservoir replacing the fluid that is delivered to the delivery passage from the pump. The fluid taken from the reservoir in turn is replaced by a return flow of fluid through a return passage communicating with the reservoir and with the motor or servo as it is driven by the pump. As indicated earlier, one application for the pump would include a motor in the form of a power steering gear in an automotive vehicle steering system. The pump rotor is adapted to be connected drivable to the crankshaft of an internal combustion engine used in an automotive vehicle driveline.

BRIEF DESCRIPTION OF THE FIGURES OF THE DRAWING

FIG. 3 is an end view of the pump of FIG. 1. The plane of the section of FIG. 1 is taken along section line 1—1 of FIG. 3.

FIG. 5 is a cross-sectional view taken along the plane of section line 5—5 of FIG. 1.

FIG. 6 is a cross-sectional view taken along the plane of section line 6—6 of FIG. 1. This view shows the porting formed on the housing of the pump of FIG. 1.

FIG. 7 is a cross-sectional view taken along the plane of section line 7—7 of FIG. 2.

FIG. 8 is a cross-sectional view taken along the plane of section line 8—8 of FIG. 2.

FIG. 9 is a partial cross-sectional view as seen from the plane of FIG. 2 showing side cuts in the slipper elements of the pump.

FIG. 10 is a cross-sectional view taken along the plane of section line 10—10 of FIG. 2.

PARTICULAR DESCRIPTION OF THE INVENTION

Figure 1:
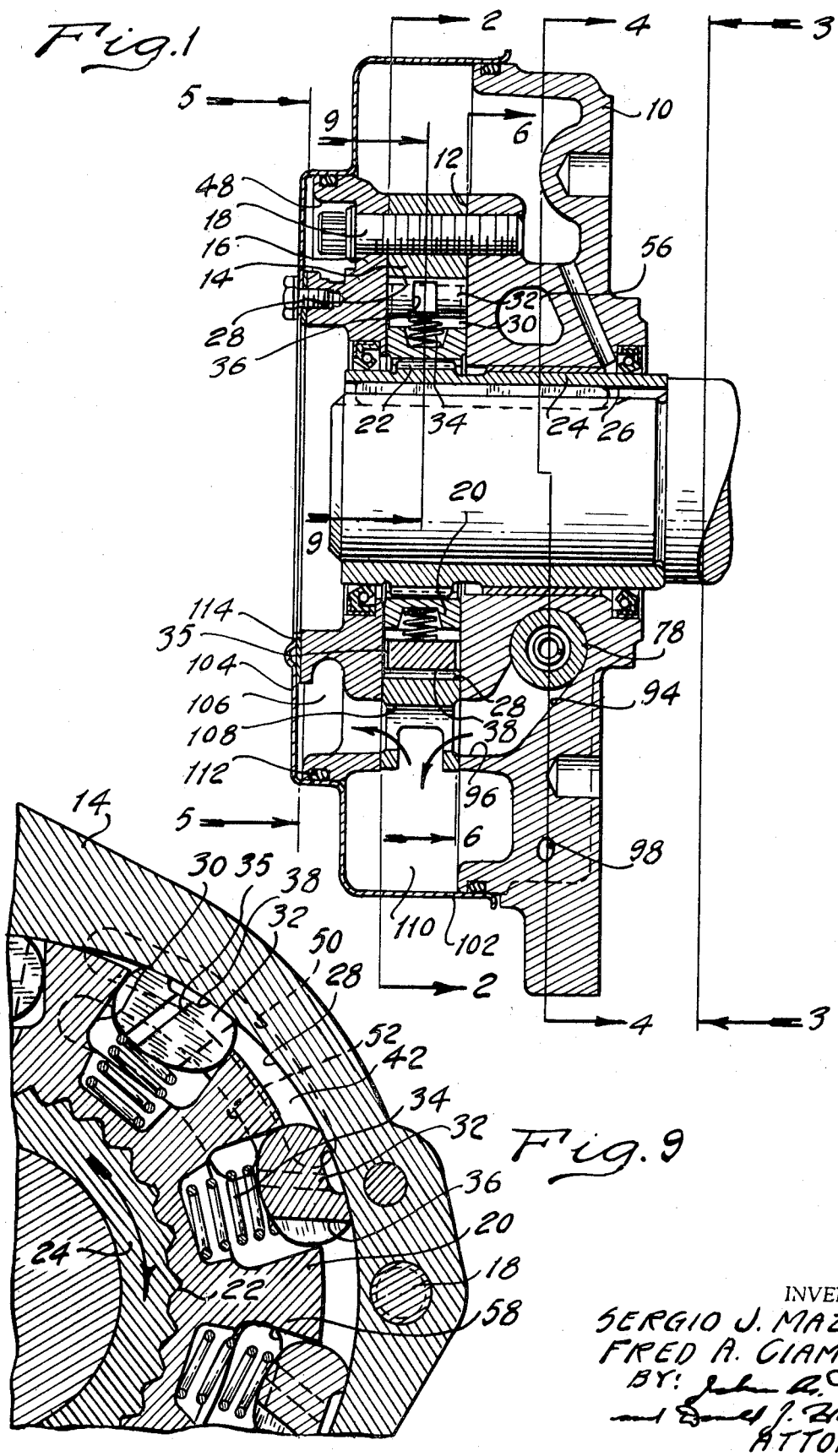
FIG. 1 shows in longitudinal cross-sectional form a pump assembly embodying the feature of my invention.

In FIG. 1 reference character 10 designates a pump housing. It is formed with a flat side surface 12 which registers with the side of a pump-housing ring 14. An end-housing plate 16 is disposed on the other side of the ring 14. The housing 10, the ring 14 and the plate 16 are held in axially fast, assembled relationship by clamping bolts 18.

Situated within the ring 14 and between the surface 12 and the plate 16 is a rotor 20 of circular configuration. It is formed with a central opening which is internally splined to permit a splined connection at 22 with drive shaft 24. The drive shaft 24 is in the form of a sleeve which is adapted to be received over the crankshaft of an internal combustion engine. A key and slot connection may be used to establish a driving connection between the sleeve 24 and the crankshaft. For this reason a slot 26 is formed in the interior of the sleeve 24 as indicated.

Figure 2:
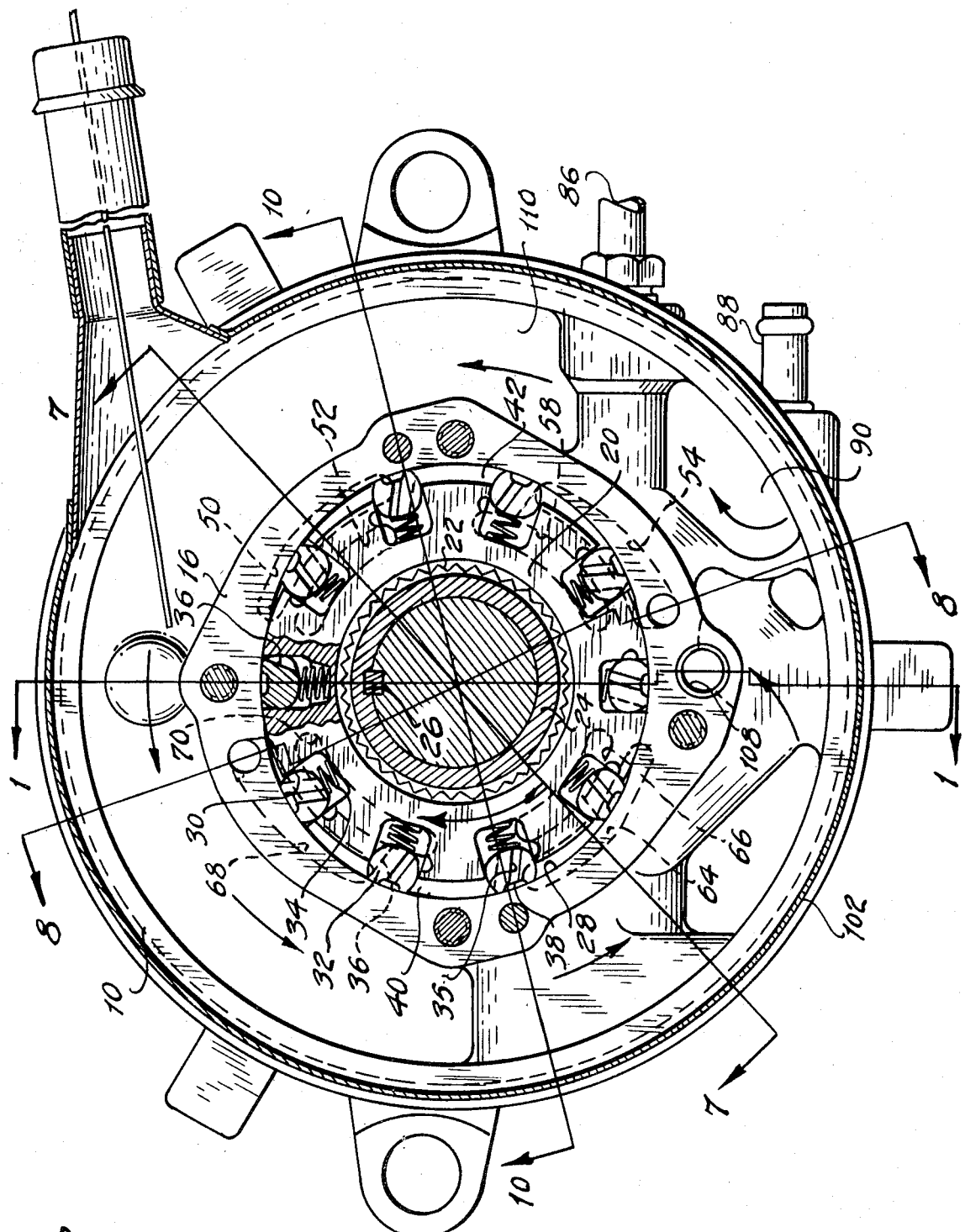
FIG. 2 is a cross-sectional view of the pump of FIG. 1 as seen from the plane of section line 2—2 of FIG. 1.

Housing ring 14 serves as a pump cam member. It includes an internal cam surface 28 having a configuration of predetermined contour as shown in FIG. 2. The rotor 20 is formed with peripheral openings 30 at evenly spaced peripheral locations. Situated in each opening 30 is a pumping element in the form of a slipper 32. A slipper spring 34 is located between the base of the opening 30 and the radially inward side of the slipper 32, thereby normally urging the slipper 32 into camming engagement with the cam surface 28.

As seen in FIG. 2, rotor 20 rotates in a clockwise direction. The leading edge of each slipper is slotted as shown at 36 to permit equalization of pressure in the pumping chambers with respect to the chamber on the radially inward side of the slipper. The contour of the cam surface 28 deviates from the contour of the surface of the rotor so that maximum displacement of each slipper in a radially outward direction occurs when the slipper has reached a location corresponding to the horizontal axis of symmetry of the view of FIG. 2. The slippers assume a radially innermost position when they pass the vertical axis of symmetry for the view of FIG. 2. Effective sealing occurs between the rotor and slipper.

End cuts 35 are formed on the ends of the slipper 32. These assist in the transfer balancing pressure from the radially inward side of the slippers to the radially outward sides. The cuts 35 communicate with a radially outwardly positioned, axially extending recess 38 in the slipper. This recess divides the surface cooperating with the cam surface 28 into two parts thereby defining a pair of so-called rails, each of which slidably engages the cam surface 28. The contact between the rails and the surface 28 is a line contact since the curvature of the rails does not coincide with the curvature of the cam surface. This contributes to the development of an oil film between the slippers and the cooperating cam surface, which film reduces war during pump operation.

One of the two pumping chambers defined by the ring 14 and the rotor 20 is shown at 40. A companion pumping chamber on the opposite side of the axis of the pump is shown at 42. A fluid inlet port 44 communicates with a chamber 42. It is formed in a plate 16 as indicated best in FIG. 7. A cooperating inlet port 46 is in fluid communication with the port 44. Both of these ports communicate with the reservoir chamber 48 shown in FIG. 7.

These same ports 44 and 46 communicate also with blind inlet ports or balance ports, as shown at 50 and 52. These ports are formed in the housing 10. Any pressure that exists in the ports 44 and 46 is present also in the ports 50 and 52. This creates a balanced condition on the rotor 20 thereby avoiding axial forces on the rotor.

An outlet port is identified in FIG. 2 by reference character 54. It communicates with working chamber 42 at a location angularly spaced from the location of the ports 44 and 46. These ports communicate with a high-pressure region 56 formed in the housing 10. Port 54 is in fluid communication with the high-pressure region 56, as well as with a secondary outlet port 58 which communicates with the lower region of each of the recesses 30. The reciprocating action of the slippers creates a pumping effect, and the pumped fluid is distributed through the port 58 to the high-pressure region 56. This action complements the vane action of slippers 32 as they pass through the working arc for the working chamber 42.

As indicated in FIG. 8, ports 54 and 58 communicates respectively with line pressure-balancing ports 60 and 62 through the pumping chamber. The pressure in the ports 54 and 58 thus will be balanced by a pressure in the ports 60 and 62, thereby avoiding axial pressure forces on the rotor 20.

Pumping chamber 40 is formed with two inlet ports and two outlet ports that correspond respectively to the inlet ports 50 and 52 and to the outlet ports 54 and 58. The inlet ports 40 for pumping chamber 40 are identified by reference characters 64 and 66, and the outlet ports for the pumping chamber 40 are identified by reference characters 68 and 70.

Figure 4:
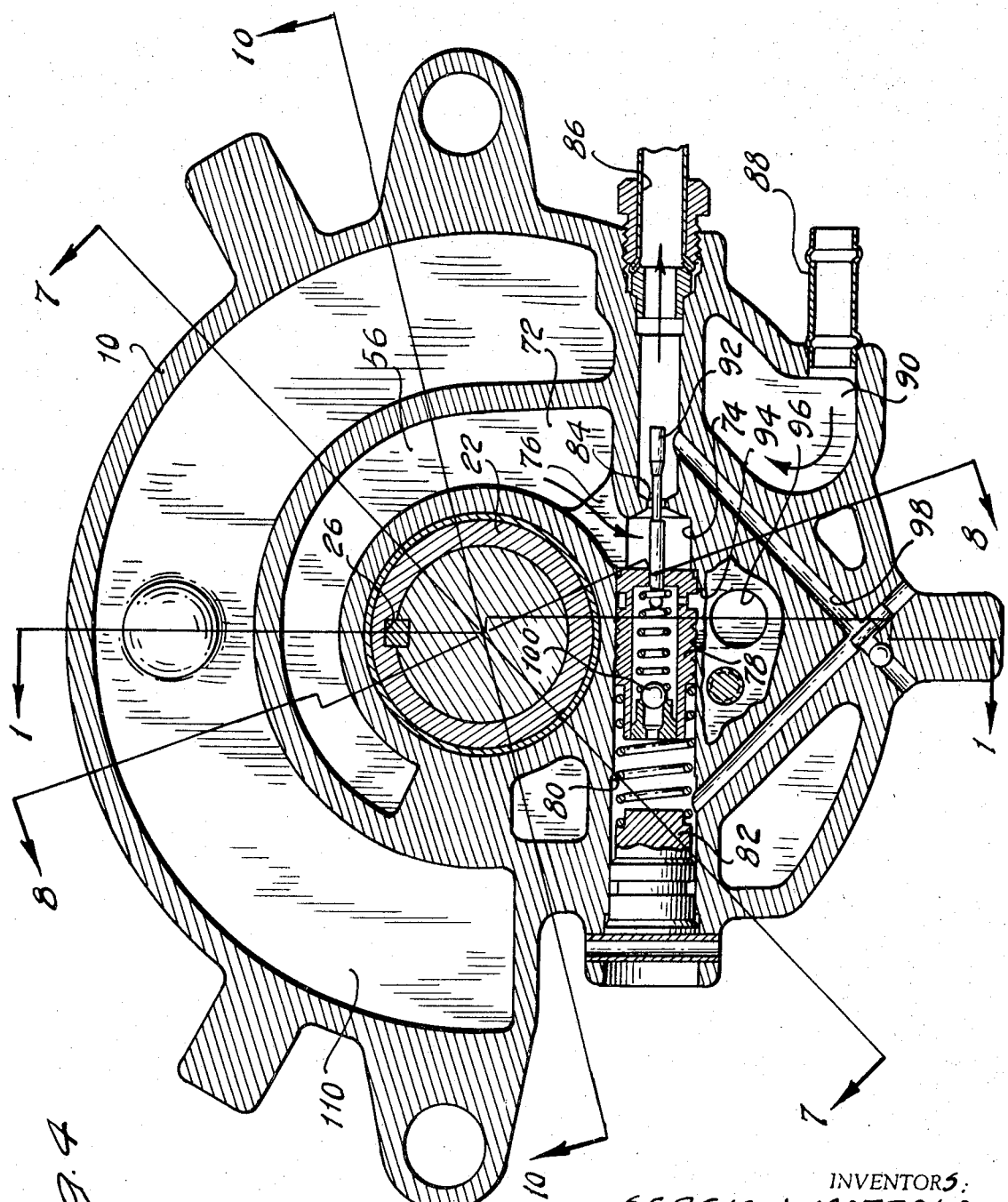
FIG. 4 is a cross-sectional view taken along the plane section line 4—4 of FIG. 1.

As indicated in FIGS. 1 and 4, the outlet ports communicate with a pressure chamber 72 which is a continuation of pressure chamber 56. Chamber 72 in turn communicates directly with flow control valve chamber 74 through a flow passage 76. Chamber 74 is formed in the housing 10. It slidably receives a pressure valve sleeve 78 which normally is urged in a right-hand direction as formed by valve spring 80. Spring 80 is seated on an insert 82 which closes the end of the valve chamber 74.

A fluid control orifice 84 is formed in housing 10 in communication with a valve chamber 74. Orifice 84 communicates with flow delivery passage 86, which in turn extends to a driven member such as a power steering motor. Flow from the motor is returned to the reservoir through flow return passage shown in part at 88. This in turn communicates with reservoir chamber 90 formed in the housing 10.

Tapered needle valve element 92 is carried by the sleeve 78. When the sleeve is moved in the left-hand direction, the valve element 92 progressively restricts the flow control orifice 84. The higher the rate of restriction the higher the rate of the pressure build up on the left-hand side of the orifice. This pressure buildup causes bypass flow to occur around valve land 94, which bypasses fluid from the chamber 72 to an intake flow passage 96 as seen in FIG. 1. The pressure in the delivery line 86 is transferred to the spring chamber for the spring 80 through crossover passage 98. When this pressure exceeds a predetermined value, one-way flow check valve 100 becomes unseated thereby permitting pressurized fluid to pass directly to intake flow passage 96 through an orifice formed in the valve sleeve 78.

Reservoir chamber 90 forms a part of a reservoir which is principally defined by a cover 102. The cover surrounds the housing 10 and includes a wall 104 which extends over the side of the end plate 16. The wall 104 cooperates with the end plate 16 to define a fluid inlet cavity 106 which communicates with inlet porting formed in the end plate 16.

Fluid in the bypass path for the valve assembly shown in FIG. 4 is transferred to the intake flow passage 96 as indicated. It then passes through crossover passage portion 108 to the inlet cavity 106. In doing this it is accelerated thereby producing an aspirator effect which draws fluid from the interior of chamber 110 of the reservoir portion defined by the cover 102. At the same time, velocity pressure of the accelerated fluid creates a supercharge pressure in the cavity 106. This supercharge pressure is sealed or isolated from the fluid in the reservoir chamber 110. An annular O-ring seal 112 and a gasket 114 between the wall 104 and the plate 16 maintain an isolated condition.

The presence of the pressure balance ports and the absence of pressure plates, as in the case of conventional pump designs of this types, eliminates unbalanced pressure forces on the rotor. Furthermore, since the high-pressure regions of the pump are formed within the pump housing itself, the pressure of hydrostatic forces that would tend to produce flexure of the pump components is lacking, and accompanying leakage occurring because of such deflection is eliminated.

Having thus described a preferred form of our invention, what we claim and desire to secure by U.S. Letters Patent is:

1. A positive displacement pump assembly comprising a pump housing, a pump rotor, a cam ring secured to said pump housing including a cam surface surrounding said pump rotor, pumping elements carried by said rotor in camming engagement with said cam surface, a reservoir formed in part by said housing and surrounding said rotor, an end plate secured to said cam ring, said end plate, said cam ring and said housing being secured together in fixed axial disposition, a reservoir cover surrounding said housing and cooperating therewith to partly define said reservoir, a wall on said cover extending over said end plate and cooperating therewith to define a fluid inlet cavity, said cam ring and said rotor defining pumping chambers, said pumping elements moving through said pumping chambers upon rotation of said rotor, high-pressure outlet porting formed in said housing, a high-pressure chamber in said housing communicating with said high-pressure porting, a fluid delivery passage, valve means in said housing communicating with said high pressure chamber for dividing the flow directed through said high-pressure porting to said delivery passage and to said inlet cavity, and inlet porting in said end plate in fluid communication with said pumping chambers and said inlet cavity.

2. A positive displacement pump assembly comprising a pump housing, a pump rotor, a cam ring secured to said pump housing including a cam surface surrounding said pump rotor, pumping elements carried by said rotor in camming engagement with said cam surface, a reservoir formed in part by said housing and surrounding said rotor, an end plate secured to said cam ring, said end plate, said cam ring and said housing being secured together in fixed axial disposition, a reservoir cover surrounding said housing and cooperating therewith to partly define said reservoir, a wall on said cover extending over said end plate and cooperating therewith to define a fluid inlet cavity, said cam ring and said rotor defining pumping chambers, said pumping elements moving through said pumping chambers upon rotation of said rotor, high-pressure outlet porting formed in said housing, a high-pressure chamber in said housing communicating with said high-pressure porting, a fluid delivery passage, valve means in said housing communicating with said high-pressure chamber for dividing the flow directed through said high-pressure porting to said delivery passage and to said inlet cavity, inlet porting in said end plate in fluid communication with said pumping chambers and said inlet cavity, a crossover passage extending from said valve means to said inlet porting, means defined partly by said crossover passage for accelerating fluid toward said inlet porting, a passage extending from said reservoir to said crossover passage, said crossover passage being in fluid communication with said reservoir through said last named passage whereby fluid is drawn from said reservoir by the aspirator action developed by the acceleration of fluid in said bypass passage, the pressure in said inlet porting being supercharged by the velocity head of the accelerated fluid in said bypass passage.

3. The combination set forth in claim 1 wherein said outlet porting includes blind ports formed in said plate in registry with high-pressure portion of said pumping chamber whereby the pressure in said outlet port is balanced by the pressure in the ports in said plate, said inlet porting having blind inlet pressure ports formed in said housing in registry with said inlet porting whereby the pressure forces due to the supercharged pressure in said inlet porting is balanced by a counteracting pressure force in said blind inlet pressure ports.

4. The combination set forth in claim 2 wherein said outlet porting includes blind ports formed in said plate in registry with high-pressure portion of said pumping chamber whereby the pressure in said outlet port is balanced by the pressure in the ports in said plate, said inlet porting having blind inlet pressure ports formed in said housing in registry with said inlet porting whereby the pressure forces due to the supercharged pressure in said inlet porting is balanced by a counteracting pressure force in said blind inlet pressure ports.

5. The combination set forth in claim 3 wherein said valve means includes a flow restricting orifice in said delivery passage, a valve chamber in said housing, a movable valve element in said valve chamber arranged in registry with said orifice, said valve element being moved in one direction to decrease the effective flow area of said orifice upon an increase in the pressure in said outlet ports.

6. The combination set forth in claim 4 wherein said valve means includes flow restricting orifice in said delivery passage, a valve chamber in said housing, a movable valve element in said valve chamber arranged in register with said orifice, said valve element being moved in one direction to decrease the effective flow area of said orifice upon an increase in the pressure in said outlet ports.

* * * * *